Figures 1, 2:
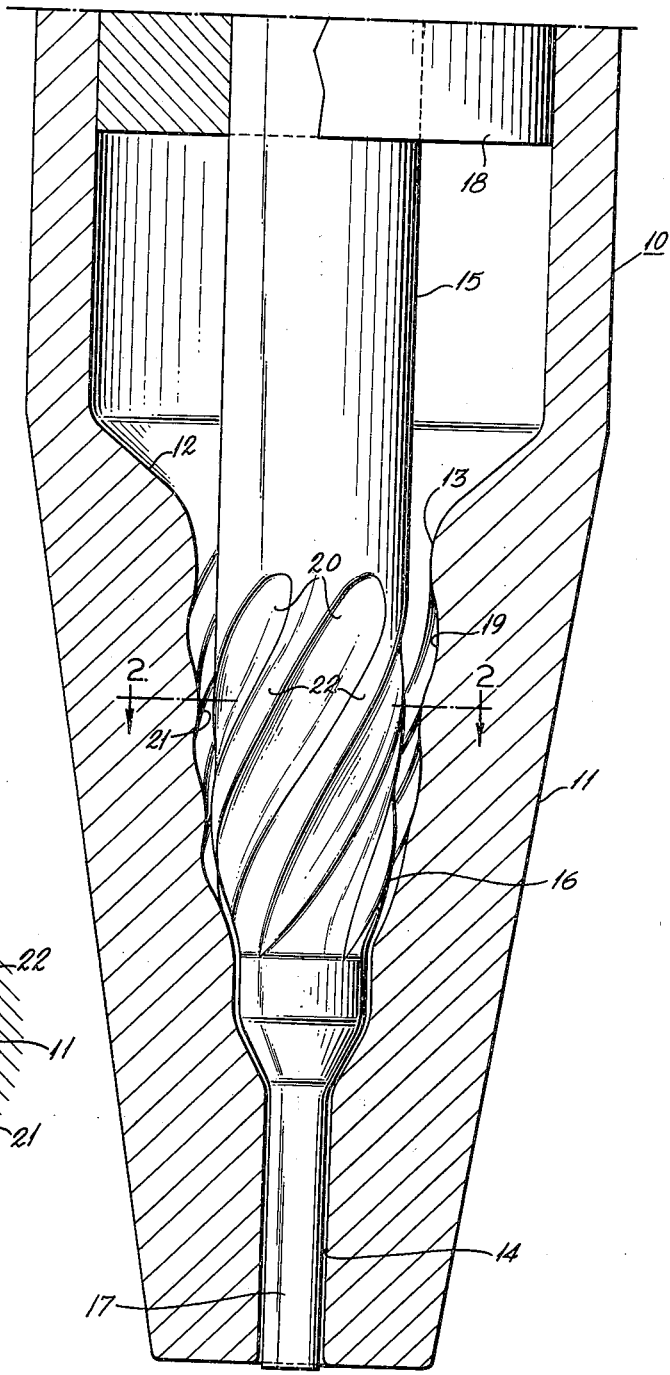

Nov. 14, 1961 — W. L. SLADE — 3,008,187
METHOD AND APPARATUS FOR EXTRUDING POLYTETRAFLUOROETHYLENE TUBING
Filed Jan. 5, 1959 — 3 Sheets-Sheet 1

INVENTOR:
WINTON L. SLADE
BY Howson & Howson
ATTYS.

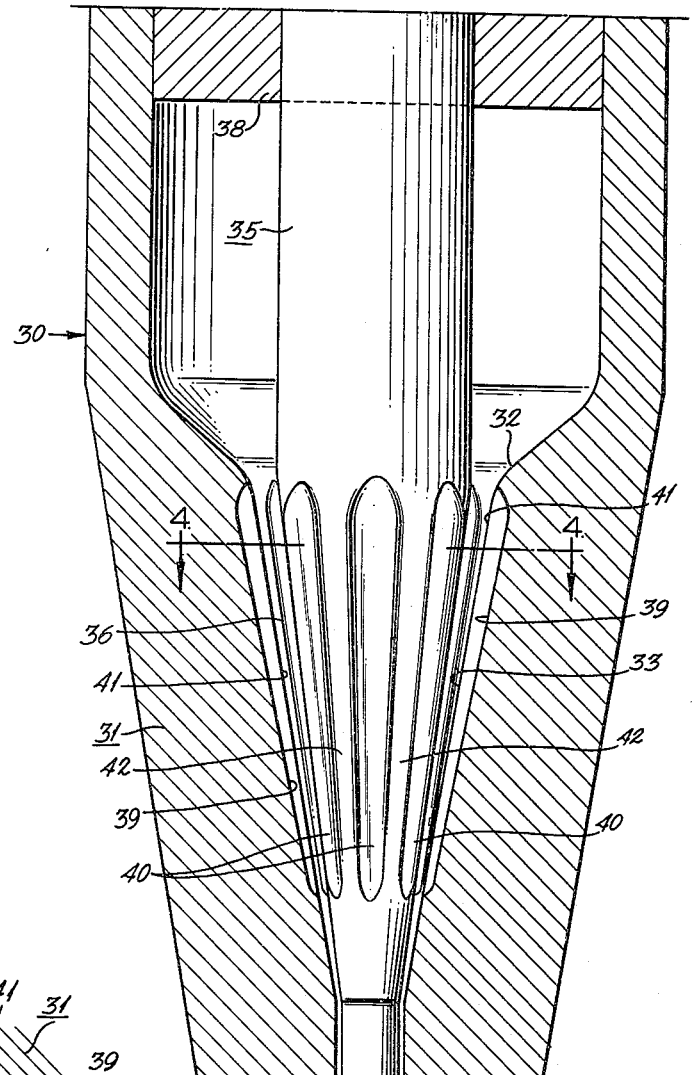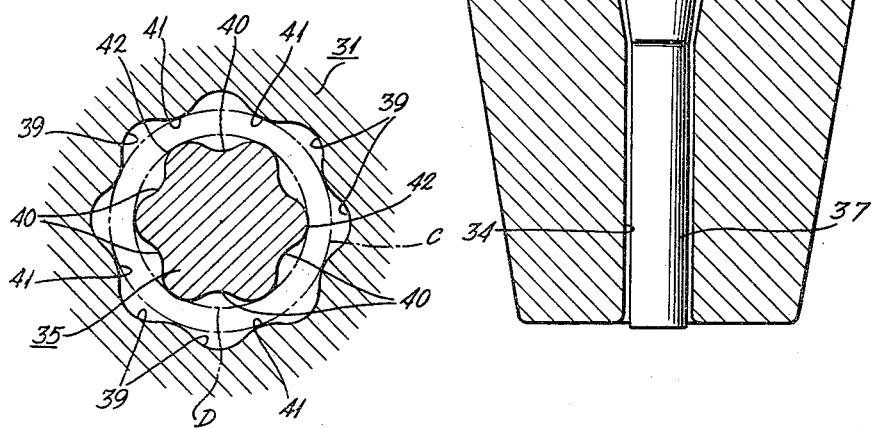

United States Patent Office 3,008,187
Patented Nov. 14, 1961

3,008,187
METHOD AND APPARATUS FOR EXTRUDING POLYTETRAFLUOROETHYLENE TUBING
Winton L. Slade, Lancaster, Pa., assignor to Raybestos-Manhattan, Inc., Manheim, Pa., a corporation of New Jersey
Filed Jan. 5, 1959, Ser. No. 784,949
10 Claims. (Cl. 18—14)

This invention relates to methods of and means for providing polytetrafluoroethylene tubing of improved properties.

Polytetrafluoroethylene possesses an unique combination of properties in that it is inert to almost all chemical solvents, is mechanically strong and tough, has exceptional dielectric properties, and can be used at temperatures from −400° to 500° F. Because of this combination of properties, polytetrafluoroethylene resin has found particular use in the form of tubing or hose for conveying corrosive liquids over a wide range of temperatures and pressures.

Recently there has been developed a method for producing thin-walled polytetrafluoroethylene tubing based on the use of a fine powder which is compounded with a liquid organic extrusion aid to permit easy formation of the desired shape below the melting point of the resin. This composition can be forced through small dies under practical manufacturing conditions.

In this process, the extrusion aid is blended with the tetrafluoroethylene resin powder, the composition is preformed to a cylindrical billet under about 100–300 p.s.i. pressure, and the preform is then placed in a ram-type extruder. The composition is forced through a forming die, by the ram, the extrusion aid is vaporized, and finally the extrudate is sintered and cooled in the form of finished tubing. Tubing with wall thickness ranging from 0.010 to 0.100 inch can thereby be produced. This process for the production of thin-walled tubing is described in U.S. Patent No. 2,685,707.

Thin-walled polytetrafluoroethylene tubing of the type described above may advantageously be employed as a liner in wire-reinforced hose. Hose of this type has been developed to withstand working pressures up to 3000 p.s.i.. over a temperature range of −65° to 450° F., and has been employed in handling such fluids as turbojet fuels, synthetic lubricating oils, synthetic ester type hydraulic fluids in aircraft and, at lesser pressures and thermal extremes, fuming nitric acid in missiles.

Although thin-walled tubing of polytetrafluoroethylene forming the liner of wire-reinforced hose is highly resistant to chemical attack by the fluids contained in it and to thermal degradation over a wide temperature range, hose liner consisting of ordinary paste-extruded polytetrafluoroethylene resin has been found to seep low viscosity fluids through its walls and to crack, particularly after being subjected repeatedly to relatively high and low temperatures in cyclic fashion. This weakness of polytetrafluoroethylene tubing has prevented unrestricted acceptance of such tubing for aircraft hose despite its excellent basic thermal and chemical properties.

One of the objects of this invention is to provide apparatus for extruding thin-walled tubing of polytetrafluoroethylene, which tubing is substantially impervious to low viscosity fluids and resistant to cracking even after such tubing has been subjected repeatedly to relatively high and low temperatures.

Another object of this invention is the provision of an improved method for paste extrusion of tetrafluoroethylene resin in manufacture of thin-walled tubing of improved properties.

Figure 5:
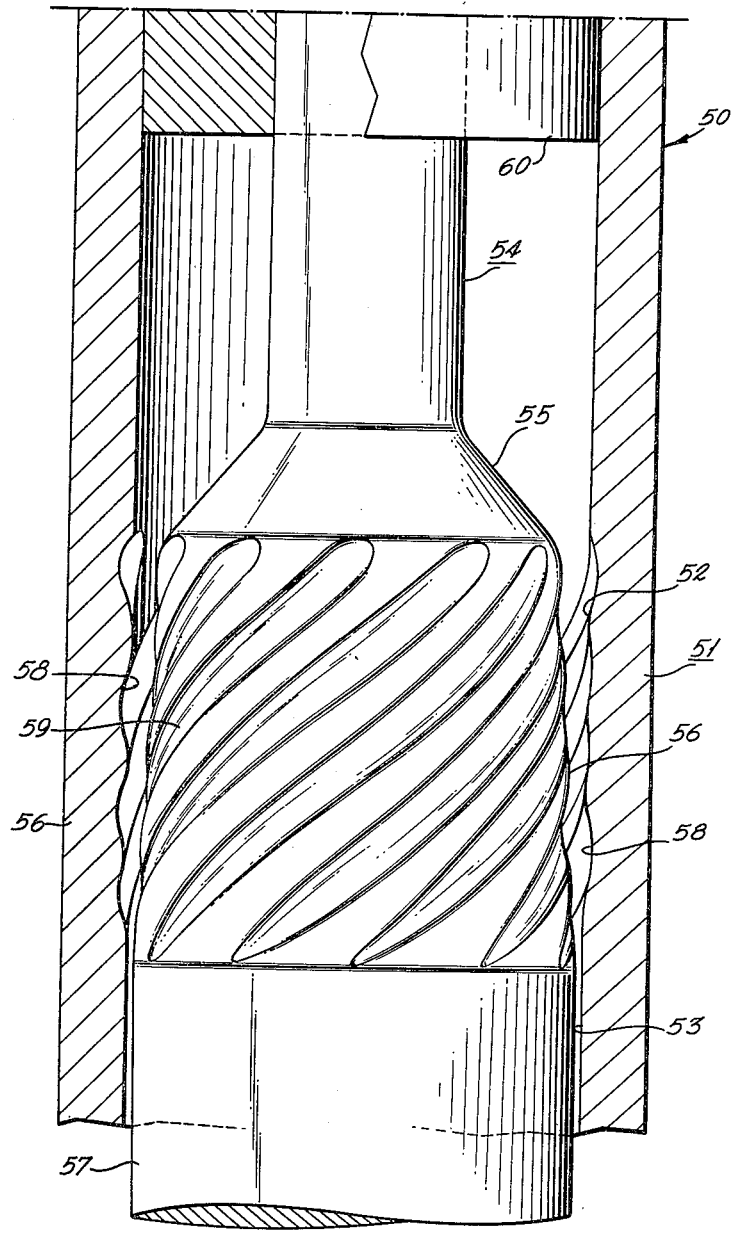

These and other objects of this invention will become more clearly apparent from a consideration of this specification and claims, and the following drawings in which:

FIG. 1 is a longitudinal vertical section partly broken away of extrusion apparatus embodying this invention;
FIG. 2 is a section on line 2—2 of FIG. 1;
FIG. 3 is a longitudinal vertical section partly broken away of a somewhat modified form of extrusion apparatus of this invention;
FIG. 4 is a section on line 4—4 of FIG. 3; and
FIG. 5 is a longitudinal vertical section partly broken away of still another form of extrusion apparatus according to this invention.

In the manufacture of thin-walled tubing of polytetrafluoroethylene by the paste extrusion method disclosed in U.S. Patent 2,685,707, when an annular billet of resin and volatile extrusion aid is rammed between the mandrel and the die so that the initially large cross-section of the billet is substantially reduced to that of the wall thickness of the desired tubing, particles of the resin are formed into fibers. These resin fibers extend in the direction of extrusion, and after removal of volatile lubricant, as for example by application of heat, the fibrous, porous unsintered tube structure is strong longitudinally, i.e. in the direction of extrusion, but weak transversely and can be readily split into longitudinally extending fiber bundles.

During the sintering operation the tubing which has been freed from volatile extrusion aid shrinks about 40% in the direction of extrusion, the porosity virtually disappears, and the fibrous structure appears to disappear by fusion to form a homogeneous tube wall of nearly zero void content.

However, tubing so formed develops seepage and cracking tendencies. Microscopic examination of the tubing which has developed seepage reveals many small cracks running longitudinally in the wall structure, i.e. in the direction of extrusion. The similarity between these cracks and cracks obtained by separation of longitudinally extending fibers in the fibrous unsintered tubing which has been freed from volatile extrusion aid indicate that in order to obtain a more impervious wall, better interfiber bonding is required than that obtained with paste extrusion apparatus and methods presently available.

It was found that the tendency of thin-walled tubing of polytetrafluoroethylene to crack and seep low viscosity fluids can be substantially eliminated provided the normal linearity of the fibrous resin structure of extruded tubing could be disrupted in a particular way so that fibers forming at least one surface of the tubing are disposed at an angle to those fibers forming the opposite surface of the tubing.

According to this invention, therefore, there is provided a method for forming polytetrafluoroethylene tubing of improved resistance to cracking and seepage of low viscosity fluids which comprises advancing an annular billet of a substantially homogeneous composition comprising finely-divided tetrafluoroethylene resin and a volatie extrusion aid through a die provided with a centrally located mandrel extending into the orifice of the die so as to provide an annular opening, reducing the annulus of the billet by at least 90% by means of the mandrel and die to transform particles of tetrafluoroethylene resin into fibers extending generally in the direction of extrusion, displacing said fibers forming the outer surface layer and the inner surface layers of said annular billet with respect to each other by means of said mandrel and die while further reducing said annulus of the billet by from about 50 to about 95% so that the fibers forming the respective surface layers of the billet are disposed at an angle from about 15° to about 60° with respect to each other, passing said billet through the annular opening to form a tube, removing the extrusion aid, and sintering the tube.

Apparatus which are particularly suitable for carrying out the method of this invention are illustrated in the accompanying drawings.

Referring to FIG. 1, the extrusion apparatus of this invention there illustrated comprises a hollow mantle 10 and a die 11 constituting a continuation of the mantle. Although the mantle and die are shown as being formed of a single piece of material, such as steel, the mantle and die may be separate parts which are assembled to form the completed extrusion unit. Die 11 is provided with a first tapered circular inner surface 12, and a second tapered circular inner surface 13 which merges into the smaller end of tapered surface 12. The smaller end of second tapered surface 13 merges into a cylindrical inner surface comprising nozzle 14.

Centrally located within the mantle and die and spaced apart therefrom is a mandrel 15. This mandrel has a tapered circular outer surface 16 which merges into and terminates in an outer cylindrical surface 17. The tapered circular outer surface 16 of the mandrel is so disposed as to be located opposite the tapered circular inner surface 13 of die 11, and the cylindrical outer surface 17 of the mandrel is located within the cylindrical nozzle 14 of the die so as to define an annular opening.

The opposite end of mandrel 15, not shown, is secured in well known fashion to prevent movement of the mandrel with respect to the mantle and die. However, according to one embodiment of this invention means are provided for effecting rotary movement between the mandrel and die. This embodiment is more fully described with reference to FIG. 3.

The taper of the first tapered circular surface 12 of the die should be such that the cross-sectional area of the annular space between the die and mandrel 15 is reduced by at least about 90 percent over said surface. The purpose for such area reduction is to form resin particles into resin fibers, which fibers are further acted upon according to the method and apparatus of this invention. A taper of from about 50° to about 75° from the axis is generally satisfactory for effecting this area reduction where the opposing outer surface of the mandrel is substantially cylindrical.

Disposed in the annulus between the mandrel 15 and mantle 10 is an annular ram 18 which is capable of reciprocating movement. A hydraulic piston, not shown, is preferred as a device for driving the ram, although other suitable means such as a jack screw may be used to drive small diameter rams. Equipment capable of providing about 10,000 p.s.i. at the ram face is adequate for most applications according to this invention.

The second tapered circular inner surface 13 of the die is provided with a plurality of helical grooves 19 and the tapered circular outer surface 16 of the mandrel is likewise provided with a plurality of helical grooves 20. The number of helical grooves 19 and 20 may be varied; however, they should be sufficient in number (and of sufficient depth, etc., as hereinafter explained) to displace resin fibers forming at least the surface layers of the annular billet of resin and volatile extrusion aid so that the angle between the fiber layers forming the outer surface and those fibers forming the inner surface of the billet is at least about 15 degrees. Generally, providing the mandrel with from about 4 to about 7 helical grooves and the die with about 5 to 10 helical grooves is sufficient to insure the fiber displacement above described. Each of grooves 19 and 20 defines an arc over its length of from about 120° to about 200°, and preferably about 180°.

The grooves 19 and 20 are formed with smooth curved surfaces which can best be seen with reference to FIG. 2. Likewise the lands 21 and 22 of grooves 19 and 20, respectively, have smooth curved surfaces. The grooves 19 and 20 decrease in depth with direction toward the orifice of the extrusion apparatus formed by the smaller outer cylindrical surface 16 of the mandrel and the inner cylindrical surface 13 of the die.

Referring to FIG. 2, the cross-sectional area of the annular space between the second tapered circular inner surface 13 of the die and the tapered circular outer surface 16 of the mandrel decreases over the grooved portions thereof with distance toward the smaller ends of these tapered surfaces by from about 50 to about 95 percent, and preferably from about 60 to about 80 percent. The cross-sectional area referred to includes not only the annular space bounded by the lands 21 and 22 of the die and mandrel, respectively, which area is indicated by that lying between the concentric circles shown as dotted lines A and B in FIG. 2, but also includes the areas defined by the grooves themselves.

Preferably the depth of grooves 19 and 20 is from about 2 to about 5 times the distance between tapered surfaces 13 and 16 of the die and mandrel, respectively, measured at opposing lands at each point along the axis of the mandrel and die. Thus, with reference to FIG. 2, the depth of grooves 19 and 20 is from about 2 to about 5 times the distance between concentric circles A and B at each point along the grooved portions of the die and mandrel.

Another important feature with respect to grooves 19 and 20 is that the total cross-sectional area of both grooves 19 and grooves 20 at any point taken transversely to the axis of the die and mandrel is from about ⅓ to about ⅔ the cross-sectional area of the annular space bounded by opposing lands of the tapered circular surfaces of the mandrel and die. In other words, the total cross-sectional area of grooves 19 at each point along the axis of the mandrel and die is equal to from about ⅓ to about ⅔ the area between the concentric circles A and B. The same relationship applies to grooves 20.

The length of the grooved, tapered portions of the die and mandrel will vary depending upon the size of the mantle and extrudate, and the angle the die grooves make with those of the mandrel. The grooved tapered portions should be long enough to create at least 360° of differential rotation between fibers forming the liner and outer surfaces of the extrudate passing therethrough. For example for large size tubing having an O.D. of 6 in., made in apparatus of FIG. 5, from a preform having an O.D. of 6 in., a length of about 12–16 in. is generally required, whereas for 3/16 in. O.D. tubing made from a preform of 3½ in. O.D., in apparatus of FIG. 1, a relatively short length of taper of 2–4 in. usually will suffice.

The length of the orifice formed by cylindrical surface 34 of the die and 37 of the mandrel preferably is from about 5 to about 7 times the diameter of the mandrel measured at the orifice. With an orifice of such length, it was found that the internal diameter and wall thickness of the final sintered tubing was more uniform and less sensitive to variations in extrusion rate and other variables.

It was found that if the above-described relationships regarding the mandrel and die are employed, tubing is obtained which is substantially resistant to seepage by low viscosity fluids after the tubing has been subjected to thermal cycling under pressure.

The apparatus illustrated in FIG. 3 is generally similar to that illustrated in FIG. 1; however, the FIG. 3 apparatus is particularly designed for relative rotational motion of the mandrel with respect to the die during extrusion of thin-walled tubing. It should be pointed out, however, that although the apparatus illustrated in FIG. 1 operates satisfactorily with the mandrel maintained in fixed relationship with respect to the die; nevertheless, it is within the scope of this invention to provide rotational movement between the die and mandrel illustrated in this figure.

The apparatus in FIG. 3 comprises a hollow mantle 30 and a die 31 constituting a continuation of the mantle. Die 31 is provided with a first tapered circular inner surface 32, and a second tapered circular inner surface 33 which merges into the smaller end of tapered surface 32. The smaller end of second tapered surface 33 merges into a cylindrical inner surface comprising nozzle 34.

Centrally located within the mantle and die and in spaced relationship therewith is a mandrel 35 which has a tapered circular outer surface 36 which merges into and terminates in an outer cylindrical surface 37. The tapered circular outer surface 36 of the mandrel is disposed so as to be located opposite the tapered circular inner surface 33 of the die, and the cylindrical outer surface 37 of the mandrel is located within the cylindrical nozzle 34 of the die so as to define an annular opening.

The opposite end of mandrel 35, not illustrated, is secured to prevent movement of the mandrel with respect to the mantle and die, other than rotary movement. Either the mantle and die or mandrel is provided with means for rotation, not shown, so that the one may rotate with respect to the other.

Disposed in the annulus between the mandrel 35 and the mantle 30 is an annular ram 38 which is capable of reciprocation within the mantle by means such as that described with respect to the apparatus illustrated in FIG. 1.

The second tapered circular inner surface 33 of the die is provided with a plurality of grooves 39 extending generally axially of the apparatus, and the tapered circular outer surface 36 of the mandrel is likewise provided with a plurality of similarly disposed grooves 40. The grooves in the mandrel may comprise generally from about 6 to 10 in number, whereas the grooves in the die generally may vary from about 8 to 12 in number.

The grooves 39 and 40 are provided with smooth curved surfaces which can best be seen in FIG. 4. Likewise the lands 41 and 42 of grooves 39 and 40, respectively, have smooth curved surfaces. The grooves decrease in depth with direction toward the orifice of the extrusion apparatus in the same manner as the grooves in the apparatus of FIG. 1.

The same relationships apply between elements of the apparatus illustrated in FIGS. 3 and 4 as those illustrated in FIGS. 1 and 2 as regards taper of the first tapered circular surface 32 of the die, cross-sectional area of the annular space between the second tapered inner surface 33 of the die and the tapered outer surface 36 of the mandrel, the depth of grooves 39 and 40, the total cross-sectional area of the grooves, and length of orifice. For example, grooves 39 and 40 have a depth of from about 2 to 5 times the distance between concentric circles C and D of FIG. 4 at each point along the tapered portions of the die and mandrel, and the total cross-sectional area of grooves 39, and also grooves 40, at each point along the axis is from about ⅓ to about ⅔ the cross-sectional area of the annular space lying between concentric circles C and D measured at the same point.

In FIG. 5 there is illustrated another form of apparatus according to this invention, which apparatus functions in the same manner as apparatus illustrated in the previously discussed figures. The apparatus for extruding relatively large diameter thin-walled tubing of tetrafluoroethylene resin shown in FIG. 5 comprises a hollow mantle 50 and a die portion 51 constituting a continuation of the mantle. Die 51 has a substantially cylindrical inner surface 52, the end portion of which comprises a cylindrical nozzle 53. Centrally located within the mantle and die and spaced apart therefrom is a mandrel 54 having a first tapered circular outer surface 55 and a second tapered circular outer surface 56 which merges into the larger end of the first tapered surface. The second tapered surface 56 terminates at its larger end in an outer cylindrical surface 57 which is located within cylindrical nozzle 53 and is spaced apart therefrom so as to define an annular opening in the nozzle.

The inner cylindrical surface of die 51 is provided with helical grooves 58 and the second tapered circular outer surface of the mandrel is provided with grooves 59. Grooves 58 and 59 are so disposed as to lie opposite each other, and the direction of rotation of grooves 58 is opposite to that of grooves 59. Grooves 58 and 59 and the lands between these grooves are also formed with smooth curved or rounded surfaces and the grooves decrease in depth with direction toward the extrusion orifice.

Located in the annular space between mandrel 54 and mantle 50 is an annular ram 60 which is capable of reciprocating movement by suitable means as described in connection with FIG. 1.

As was the case with the apparatus of FIGS. 3 and 4, the relationship between elements of FIG. 5 is the same as those between similar elements of the FIG. 1 apparatus. Thus, the taper of the first tapered circular surface 55 of mandrel 54, which functions in a similar manner to tapered die surface 12 of FIG. 1, should be such that the cross-sectional area of the annular space between the die and mandrel is reduced by at least about 90 percent over this tapered surface to effect formation of resin fibers from resin particles. A taper of about 50°–75° from the axis is generally satisfactory for this purpose where the opposing die surface is not tapered. Grooves 58 and 59 should have the same depth and total cross-sectional area as grooves 19 and 20 of FIG. 1. Also the reduction in cross-sectional area of the space between the grooved portions of the die and mandrel should be from about 50 to about 95 percent, and preferably from about 60 to 80 percent, over said grooved portion.

In extruding thin-walled polytetrafluoroethylene tubing in accordance with the method and apparatus of this invention, a batch of extruding compound, such as that described in U.S. Patent No. 2,685,707, is prepared by thoroughly mixing together finely divided resin particles and a volatile extrusion aid such as white oil, naphtha, etc. The amount of extrusion aid employed depends to a large degree upon the ratio of the cross-sectional area of the billet or preform charged to the extrusion apparatus to that of the extrudate. Generally from about 15 to about 25 percent of lubricant, based on weight of lubricant and resin, may be employed in providing tubing of high quality.

An annular preform is then prepared from this extrusion composition by compacting the composition in a preform cylinder having a centrally disposed core rod. The dimensions of the compacting cylinder should be such that the radian clearance between the preform and the walls of the mantle of apparatus according to this invention, such as those illustrated in the drawings, is about 20 to 30 mils.

A weighed quantity of the composition to be extruded is poured into the preform cylinder with care to assure that the powder is evenly distributed around the core rod. After inserting a closure plug in the preform cylinder, pressure is applied to compact the preform. Pressure should be built up to about 100 to 300 p.s.i. over a period of several minutes and then slowly released. The resulting preform is a dense, clay-like product.

The extrusion process of this invention employing apparatus of the type illustrated in the several drawings is carried out batch-wise. The apparatus is stopped after each preform has been extruded and the ram retracted to insert a new preform in the extrusion cylinder.

The pressure required for extrusion will vary, depending to a large degree on the ratio of the cross-section of the preform to that of the tubular product. If this ratio is, for example 250:1, a pressure of the order of 5000 p.s.i. at the ram face is generally required.

Referring to FIG. 1, during extrusion as the extrusion composition is forced by the ram through the annular space bounded by tapered circular surface 12 of the die and mandrel 15, the cross-sectional area of the preform is reduced on the order of 90 percent or more, and resin particles are formed into resin fibers extending in the general direction of extrusion.

Thereafter the fibrous preform of substantially reduced cross-section is passed through the annular space bounded by second tapered surface 13 of the die and tapered surface 16 of the mandrel. During the travel of the preform through this area the cross-sectional area is further reduced by from about 50 to about 95 percent, and preferably from about 60 to 80 percent. In addition, the fibers forming the outer surface layers and the inner layers of the annular preform follow the flow path of least resistance presented by the grooves 19 in the die and 20 in the mandrel. In this way the resin fibers destined to become the outer surface of the extruded tube are twisted toward the right and those which will form the inside surface of the tube are twisted to the left. This displacement of the fibers forming an inner and outer surface layer of the tube, which preferably is at least about 360°, disposes them at an angle with respect to each other, which angle should be at least about 15 degrees and preferably is from about 30 to about 60 degrees. The extrudate thereafter passes out of the extrusion apparatus through the annular orifice defined by cylindrical mandrel surface 17 and cylindrical die surface 14; the extrusion aid is removed, and the tube is sintered.

Extrusion of thin-walled tubing of large diameter by means of the extrusion apparatus of FIG. 5 is substantially the same as that described with respect to FIG. 1. In this instance, however, area reduction of the preform to form resin fibers is effected by means of tapered circular surface 55 of the mandrel. Thereafter the fiber orientation and further cross-sectional area reduction is effected over the grooved portions of the mandrel and die in the same fashion as is achieved in the FIG. 1 apparatus.

In the apparatus of FIG. 3, after substantial reduction in cross-section of the preform over tapered surface 32 of the die, the above described resin fiber orientation is effected over the grooved portions of the die and mandrel by rotation of either the die or mandrel or by rotation of both of die and mandrel in opposite directions. The rate of rotation depends upon the extrusion rate, the rate of rotation increasing with the rate of extrusion. A rate of rotation of the mandrel with respect to the die of about 4 r.p.m. for extruding rates of the order of 1 foot per minute is generally satisfactory in providing the desired resin fiber orientation, this rate being increased to about 120 r.p.m. at extruding rates of the order of 30 ft. per minute.

The extrusion apparatus shown in the drawings may be operated when disposed in either a horizontal or vertical direction. Horizontal extrusion may be employed in conjunction with subsequent batch vaporization and sintering, and vertical extrusion may be employed in conjunction with subsequent continuous vertical vaporization and sintering.

In either method, the tubing is first heated to a temperature sufficient to volatilize the extrusion aid; this temperature is generally from 150° F. to 575° F., according to volatility of the extrusion aid and thickness of extrudate wall. Higher temperatures are required to volatilize less volatile extrusion aids, and lower temperatures and longer times are preferred to prevent bubbling in thick walls of heavy cross-section.

When volatilization is completed, the temperature is increased to above 620° F., to effect sintering of the tubing. The tubing temperature should reach 700° to 750° F. for good sintering. The minimum time at these temperatures to effect adequate sintering can be as short as 15 seconds, but somewhat better interfibre bonding may be achieved with minimum sinter times not less than one-half hour.

A composition comprising about 82 percent finely divided particles of polytetrafluoroethylene and 18 percent naphtha was molded into a preform and extruded in the form of thin-walled tubing in apparatus of the type illustrated in FIG. 1. After removal of naphtha and sintering there was obtained a 3 ft. length of tube of $13/32$ in. O.D. and 0.043 in. wall thickness. This tube divided into three 1 ft. lengths and each was used as the liner of a braided wire-reinforced hose having a $9/16$ in. O.D.

These hoses were tested as follows:
(1) Pressurized 2 hours with red-dyed JP–4 turbojet fuel at 1500 p.s.i. at room temperature;
(2) Pressurized 22 hours with a silicate ester high temperature hydraulic fluid (Monsanto Chemical Co. OS–45–1) at 1500 p.s.i. and 400° F.;
(3) Step 1 repeated;
(4) Step 2 repeated;
(5) Soaked at −65° F. for 5 hours with hose filled with red-dyed JP–4 turbojet fuel at atmospheric pressure. Pressure raised to 1500 p.s.i. and hose maintained at −65° F. for 17 hours.

The preceding series of steps constitutes a single cycle which cycle is repeated until failure. Seepage at any step of any cycle, as evidenced by appearance of red-dyed fluid on the outside of the hose or by pressure drop in a closed system, constitutes failure.

Hose produced as described above did not evidence failure in this test after 8 cycles. On the other hand three control hoses produced by means of ordinary dies and mandrels having smooth surfaces failed in the first step of the first cycle, fourth step of the first cycle and fifth step of the first cycle, respectively.

While I have described a few examples of my new method and treating means, I wish to have it understood that the invention is susceptible of many different embodiments and many different modifications, and that various changes in the procedure and in the constructional forms are considered to be within the scope of the claims.

What is claimed is:

1. Extrusion apparatus particularly adapted for production of thin-wall tubing of tetrafluoroethylene resin comprising in combination a hollow mantle and a die constituting a continuation of said mantle, said die having a first tapered circular inner surface, a second tapered circular inner surface merging into the smaller end of said first tapered surface, and a cylindrical inner surface merging into the smaller end of said second tapered circular inner surface and comprising a cylindrical nozzle, a mandrel centrally located within said mantle and die and spaced apart therefrom, said mandrel having an outer tapered circular surface merging into and terminating in an outer cylindrical surface at the smaller end thereof, said tapered circular outer surface of said mandrel located opposite said second tapered circular inner surface of said die and said cylindrical outer surface of said mandrel located within said cylindrical nozzle of said die and spaced apart therefrom to define an annular opening in said nozzle, said second tapered circular inner surface of said die and said tapered circular outer surface of said mandrel having helical grooves which progressively decrease in depth toward the smaller ends of said tapered surfaces, the depth of said grooves in said mandrel and die being from about 2 to about 5 times the distance between said tapered surfaces measured at opposing lands at each point along the axis of said mandrel and die, said grooves and lands between said grooves having smooth curved surfaces, said grooves in the circular tapered surface of said mandrel having a direction of rotation opposite to that of said grooves in the second tapered circular inner surface of said die, the cross-sectional area of the annular space between said tapered circular inner surface of said die and said tapered circular outer surface of said mandrel decreasing over the grooved portions thereof with distance toward the smaller ends of said tapered circular surfaces by from about 50 to about 95 percent, a ram capable of reciprocation within said hollow mantle and surrounding said mandrel, and means for providing said ram with reciprocating movement.

2. Apparatus according to claim 1 in which the cross-sectional area of the annular space between said tapered circular inner surface of said die and said tapered circular outer surface of said mandrel decreases over the grooved portions thereof with distance toward the smaller ends of said tapered circular surfaces by from about 60 to about 80 percent.

3. Apparatus according to claim 1 in which the angle which the direction of said grooves makes with the axis of said die and mandrel is from about 15 to about 60 degrees.

4. Apparatus according to claim 1 in which the total cross-sectional area of said grooves in said tapered circular inner surface of said die is from about ⅓ to about ⅔ the cross-sectional area of the annular space bounded by opposing lands of said tapered circular surfaces of said die and mandrel at each point along the axis of said die and mandrel, and the total cross-sectional area of said grooves in said tapered circular outer surface of said mandrel is from about ⅓ to about ⅔ the cross-sectional area of said annular space bounded by opposing lands of said tapered circular surfaces of said die and mandrel at each point along the axis of said die and mandrel.

5. Extrusion apparatus particularly adapted for production of thin-walled tubing of tetrafluoroethylene resin comprising in combination a hollow mantle and a die constituting a continuation of said mantle, said die having a substantially cylindrical inner surface and an end portion comprising a cylindrical nozzle, a mandrel centrally located within said mantle and die and spaced apart therefrom, said mandrel having a first outer tapered circular surface, a second outer tapered circular surface merging into the larger end of said first tapered surface and terminating in an outer cylindrical surface at the larger end thereof, said cylindrical outer surface of said mandrel located within said cylindrical nozzle of said die and spaced apart therefrom to define an annular opening in said nozzle, helical grooves in a portion of said inner cylindrical surface of said die and in said second tapered circular outer surface of said mandrel, said grooves and lands between said grooves having smooth curved surfaces, said grooves in said mandrel and die progressively decreasing in depth with direction toward said nozzle, the depth of said grooves in said mandrel and die being from about 2 to about 5 times the distance between said opposing grooved surfaces measured at opposing lands at each point along the axis of said mandrel and die, said grooves in said second tapered circular outer surface of said mandrel being opposite said grooves in said cylindrical inner surface of said die and said grooves in said second circular tapered surface of said mandrel having a direction of rotation opposite to that of said grooves in the cylindrical inner surface of said die, the cross-sectional area of the annular space between the opposing grooved portions of said mandrel and die decreasing with distance toward the larger end of said mandrel by from about 50 to about 95 percent, a ram capable of reciprocation within said hollow mantle and surrounding said mandrel, and means of providing said ram with reciprocating movement.

6. Apparatus according to claim 5 in which the cross-sectional area of the annular space between the opposing grooved portions of the mandrel and die decreased with distance toward the larger end of said mandrel by from about 60 to about 80 percent.

7. Apparatus according to claim 5 in which the angle the direction of said grooves makes with the axis of said die and mandrel is from about 15 to about 60 degrees.

8. Apparatus according to claim 5 in which the total cross-sectional area of said grooves in said tapered circular outer surface of said mandrel is from about ⅓ to about ⅔ the cross-sectional area of said annular space bounded by opposing lands of said mandrel and die at each point along the axis of said mandrel and die, and said grooves in said inner surface of said die is from about ⅓ to about ⅔ the cross-sectional area of the annular space bounded by the opposing lands of said mandrel and die at each point along the axis of said mandrel and die.

9. A method for providing tetrafluoroethylene resin tubing of improved resistance to seepage by low viscosity fluids which comprises advancing an annular billet of a substantially homogeneous composition comprising finely divided tetrafluoroethylene resin and a volatile extrusion aid through a die provided with a centrally located mandrel extending into the orifice of said die so as to provide an annular opening, reducing the annulus of said billet by at least about 90 percent by means of said mandrel and die to transform said particles of tetrafluoroethylene resin into fibers extending generally in the direction of extrusion, displacing said fibers forming the outer surface layers and the inner surface layers of said annular billet in opposite directions with respect to each other by means of said mandrel and said die while further reducing the annulus of said billet by from about 50 to 95 percent so that the fibers forming the respective surface layers of said billet are disposed at an angle of from about 15 to about 60 degrees with respect to each other, passing said billet through said annular opening to form a tube, removing the extrusion aid, and sintering the tube.

10. The method according to claim 9 in which the annulus of said billet is reduced from about 60 to about 80 percent while said fibers forming the inner and outer surface layers of said billet are being moved with respect to each other.

References Cited in the file of this patent

UNITED STATES PATENTS

| | | |
|---|---|---|
| 2,607,077 | Dulmage | Aug. 19, 1952 |
| 2,676,356 | Becker | Apr. 27, 1954 |
| 2,682,081 | Fisch | June 29, 1954 |
| 2,810,159 | Teichmann | Oct. 22, 1957 |
| 2,863,174 | Schuman et al. | Dec. 9, 1958 |
| 2,889,581 | Vanderhoof | June 9, 1959 |